United States Patent
Herman

(10) Patent No.: US 6,991,208 B1
(45) Date of Patent: Jan. 31, 2006

(54) EXTRACTION DEVICE FOR REMOVING A STUCK CAST PART FROM A STATIONARY MOLD OF A CASTING APPARATUS

(75) Inventor: Trent S. Herman, Waterford, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 213 days.

(21) Appl. No.: 10/023,966

(22) Filed: Dec. 18, 2001

(51) Int. Cl.
  *B29C 39/36* (2006.01)
  *B29C 43/50* (2006.01)
  *B29C 45/40* (2006.01)
(52) U.S. Cl. ............... 249/166; 425/195; 425/436 RM
(58) Field of Classification Search ........... 425/441, 425/443, 436 RM, DIG. 58, 195; 249/165, 249/166
See application file for complete search history.

(56) References Cited

U.S. PATENT DOCUMENTS

| 1,572,724 A | * | 2/1926 | Johnson et al. ............. 425/422 |
| 3,807,682 A | * | 4/1974 | Catinella et al. ............. 249/68 |
| 5,295,802 A | * | 3/1994 | Hersbt ........................ 425/139 |
| 6,245,277 B1 | * | 6/2001 | Diamond ................. 264/328.1 |

* cited by examiner

Primary Examiner—Duane Smith
Assistant Examiner—Emmanuel S. Luk
(74) Attorney, Agent, or Firm—MacMillan, Sobanski & Todd, LLC

(57) ABSTRACT

This invention relates to an extraction device for removing a stuck cast part from a stationary mold of a casting apparatus. The extraction member is disposed in the stationary mold section during the casting of a cast part and is disposed adjacent a part shape cavity. The extraction device is moveable between a first position, wherein the extraction member cooperates with the mold sections of the casting apparatus to form a part of the part shape cavity, and a second position, wherein said extraction member is operative to engage and eject the stuck cast part from the part shape cavity.

12 Claims, 3 Drawing Sheets

EXTRACTION DEVICE FOR REMOVING A STUCK CAST PART FROM A STATIONARY MOLD OF A CASTING APPARATUS

BACKGROUND OF THE INVENTION

This invention relates in general to a casting apparatus and in particular to an extraction device for removing a stuck cast part from a stationary mold of such a casting apparatus.

A conventional casting apparatus can include a stationary mold member and a moveable mold member. The stationary mold member is typically a lower mold member and the moveable mold member is typically an upper mold member. The upper mold member is moved downwardly into contact with the lower mold member so as to define an internal mold cavity. Casting material is then introduced into the mold cavity to produce a cast part. After adequate cooling, the upper mold member is moved upwardly to enable the cast part to be removed or extracted from the mold cavity.

Sometimes the cast part remains "stuck" in the lower mold after the upper mold is moved away therefrom. In order to remove the cast part from the lower mold, it is known to manually deform the cast part in the lower mold. Then, the upper mold is moved downwardly into contact with the lower mold so as to forcefully contact the "deformed" portion of the stuck cast part to cause it to wedge within the upper mold and become more stuck in the upper mold than in the lower mold. The upper mold is then moved upwardly away from the lower mold so that the cast part can be removed from the upper mold using a conventional ejection system. Unfortunately, having to remove the stuck cast part from the lower mold in this manner usually damages the cast part and makes the part unfit for use. Also, considerable time is wasted in freeing the stuck cast part from the lower mold. In addition, damage to one or both of the lower and upper molds can occur when attempting to remove the cast part in this manner. Thus, it would be desirable to provide an apparatus to be used in a casting apparatus which is able to remove or extract a stuck cast part from the lower mold which was simple, reliable and which reduces the risk of damaging or destroying the cast part and/or which eliminates or reduces the risk of damaging the lower mold, the upper mold or both the upper and lower molds.

SUMMARY OF THE INVENTION

This invention relates to an extraction device for removing a stuck cast part from a stationary mold of a casting apparatus. The extraction member is disposed in the stationary mold section during the casting of a cast part and is disposed adjacent a part shape cavity. The extraction device is moveable between a first position, wherein the extraction member cooperates with the mold sections of the casting apparatus to form a part of the part shape cavity, and a second position, wherein said extraction member is operative to engage and eject the stuck cast part from the part shape cavity.

Other advantages of this invention will become apparent to those skilled in the art from the following detailed description of the preferred embodiment, when read in light of the accompanying drawings.

DESCRIPTION OF THE PREFERRED EMBODIMENT

Figure 1:
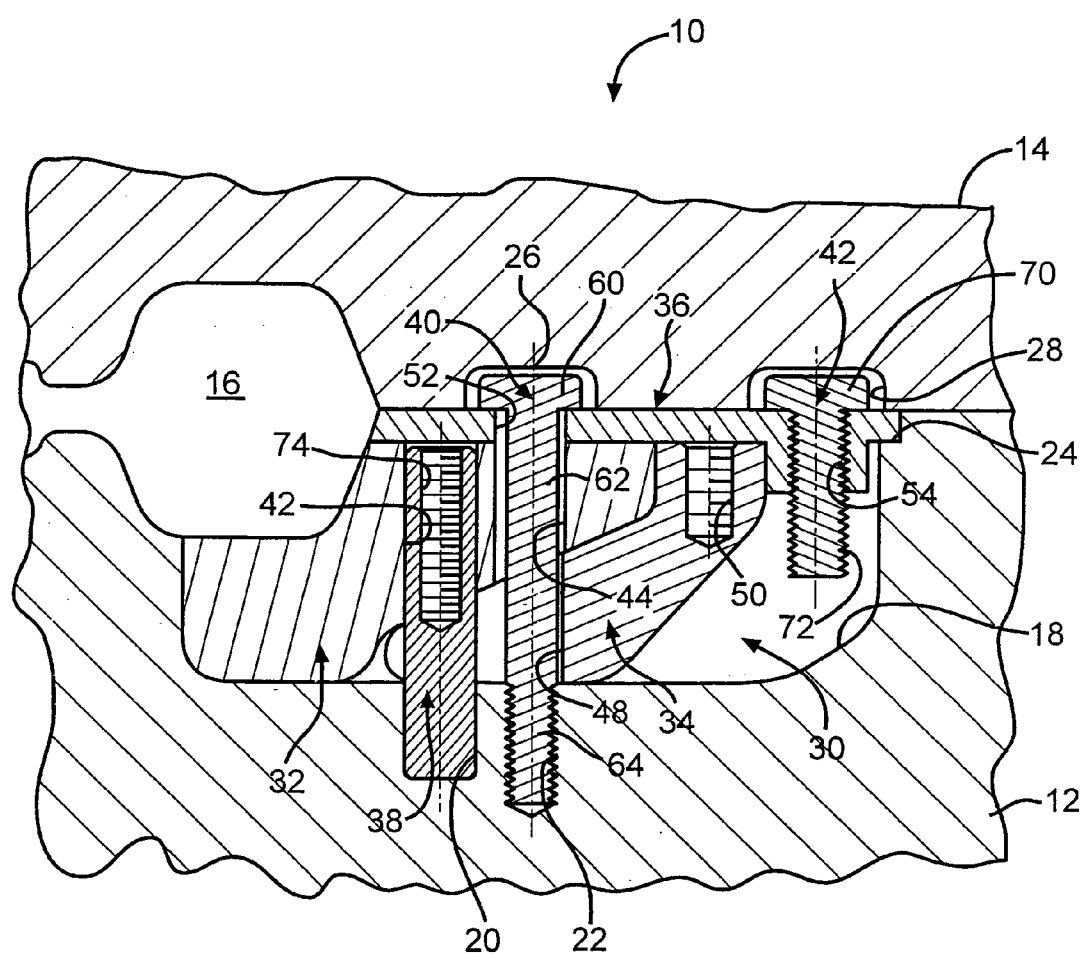
FIG. 1 is a partial sectional view of a casting apparatus including an extraction device in accordance with the present invention.

Referring to the drawings, FIG. 1 illustrates a portion of a casting apparatus, indicated generally at 10, including an extraction device 30 in accordance with the present invention. The general structure and operation of the casting apparatus 10 is conventional in the art. Thus, only those portions of the casting apparatus 10 which are necessary for a full understanding of this invention will be explained and illustrated in detail. Although this invention will be described and illustrated in conjunction with the particular casting apparatus 10 disclosed herein, it will be appreciated that this invention may be used in conjunction with other casting apparatuses.

As shown therein, the casting apparatus 10 includes a lower mold section 12 and an upper mold section 14. In the illustrated embodiment, the lower mold section 12 is a stationary mold section and the upper mold section 14 is a moveable mold section. As shown in FIG. 1, when the upper mold section 14 is in a closed, lowered position and in contact with the lower mold section 12, a part shape/gating cavity 16 is defined between the two mold sections. As will be discussed below, a suitable molten material is supplied to the cavity 16 to produce a cast part (a portion of the cast part being shown in FIGS. 2–6 by reference number 60). Suitable means (not shown) are provided for moving the upper mold section 14 from the closed, lowered position shown in FIG. 1 to a raised, open position (not shown).

In the illustrated embodiment, the lower mold section 12 is preferably provided with a cavity or pocket 18, a first opening 20, a second opening 22, and a shoulder 24 for accommodating the extraction device 30. In the illustrated embodiment, the first opening 20 is a non-threaded opening and the second opening 22 is a threaded opening. The upper mold section 14 is provided with a first opening 26 and second opening 28 for accommodating the extraction device 30. Alternatively, the construction of the lower mold section 12, the upper mold section 14 or both can be other than illustrated if so desired.

As shown in FIG. 1, the extraction device 30 includes a lever 32, a lock 34, a plate 36 a pin 38, a first threaded fastener 40, and a second threaded fastener 42. The lever 32 includes a first opening 42 and a second opening 44 formed therethrough. In the illustrated embodiment, the first and second openings 42 and 44 are non-threaded openings. The lock 34 includes a first opening 48 and a second opening 50 formed therethrough. In the illustrated embodiment, the first opening 48 is a elongated slotted opening have a generally U-shape and the second opening 50 is a threaded opening. The plate 36 is provided with a first opening 52 and a second opening 54 formed therethrough. In the illustrated embodiment, the first opening 52 is a non-threaded opening and the second opening 54 is a threaded opening. Alternatively, the construction of one or more of the openings 42, 44, 48, 50, 52 and 54 can be other than illustrated if so desired.

As shown in FIG. 1, when the extraction device 30 is installed in the lower mold cavity 18 and the mold section 12 and 14 are in the closed position, the threaded fastener 40 functions as a hold down fastener to secure the extraction device 30 in the casting apparatus 10. To accomplish this, an enlarged head 60 of the fastener 40 is disposed in the opening 26 of the upper mold 14 and a lower end of the head 60 rests against an upper surface of the plate 36. An upper non-threaded body portion 62 of the fastener 40 extends through the non-threaded opening 44 of the lever 32, and a threaded body portion 64 of the fastener 40 passes through the U-shaped opening 48 of the lock 34 and is threadably received in the threaded opening 22 of the lower mold section 12. Also, the pin 38 is disposed in the non-threaded openings 42 and 20 of the lever 32 and the lower mold section 12, respectively, in a slight interference fit therewith. The pin 38 also passes through the U-shaped opening 48 of the lock 34 but does not contact any surface thereof. The fastener 42 includes an enlarged head 70 which is disposed in the opening 28 of the upper mold 14. A lower end of the head 60 of the fastener 42 rests against an upper surface of the plate 36. The fastener 42 includes a threaded body portion 72 which is threadably disposed in the threaded opening 54 of the plate 36.

Figure 2:
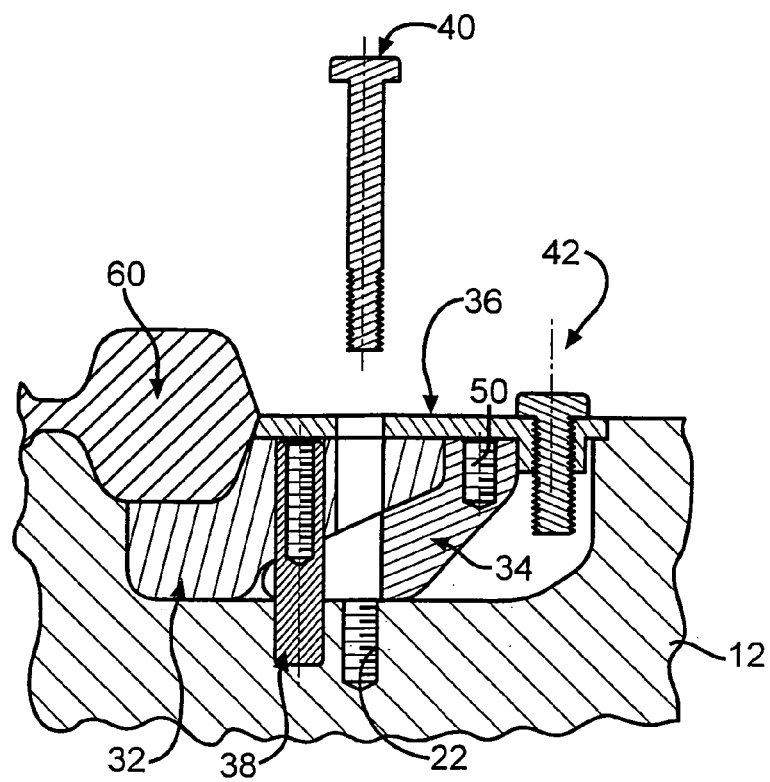
FIG. 2 is a sectional view similar to FIG. 1 showing the first step of the use of the extraction device to extract a stuck cast part from the lower mold of the casting apparatus in accordance with the present invention.

Turning now to FIGS. 2–6, the operation of the extraction device 30 will be discussed when the upper mold section 14 (not shown) has been moved to opened position and the cast part 60 has remained stuck in the lower mold section 12. As shown in FIG. 2, hold down fastener 40 is unscrewed and removed from the extraction device 30 and the fastener 42 is unscrewed but not removed from the plate 36.

Figure 3:
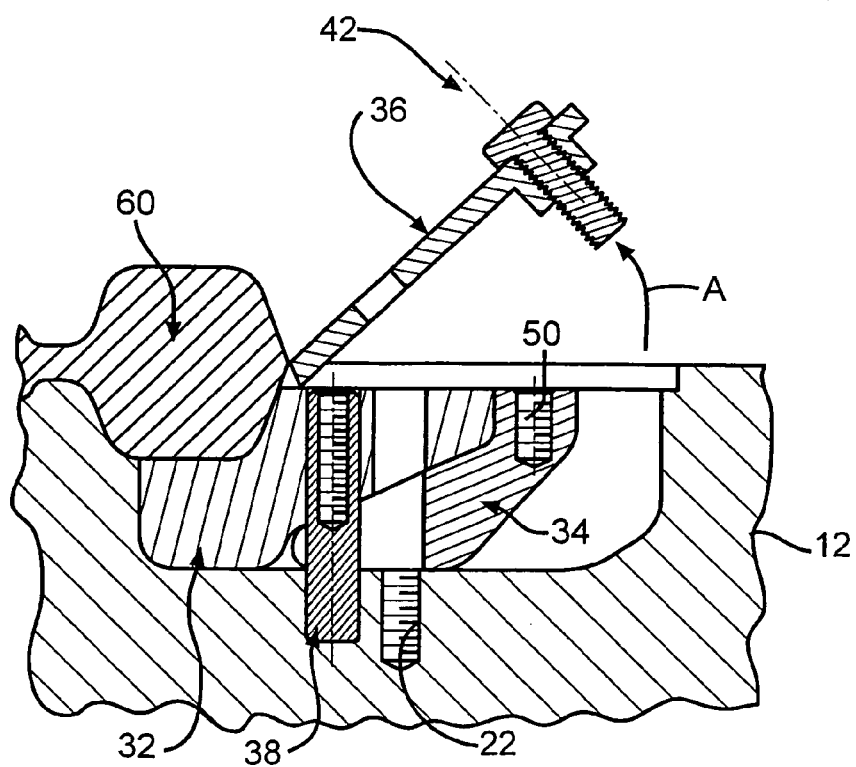
FIG. 3 is a sectional view showing the second step of the use of the extraction device to extract a stuck cast part from the lower mold of the casting apparatus in accordance with the present invention.
Figure 4:
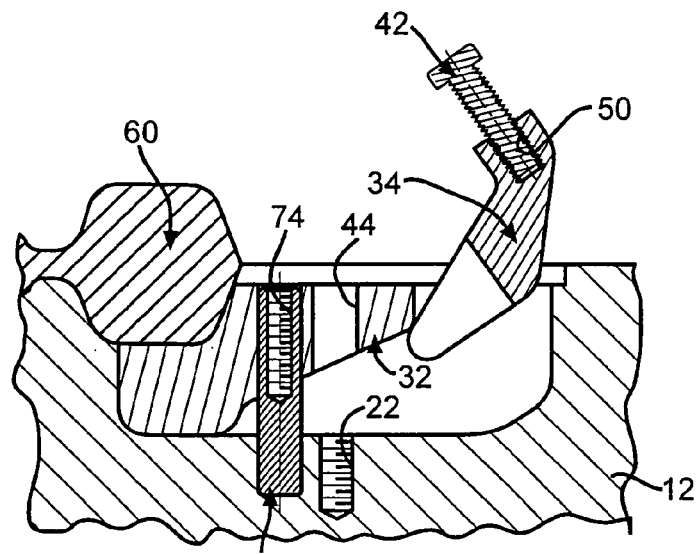
FIG. 4 is a sectional view showing the third step of the use of the extraction device to extract a stuck cast part from the lower mold of the casting apparatus in accordance with the present invention.

Next, as shown in FIG. 3, the fastener 42 is used to rotate or pivot the plate 36 in the direction of the arrow A so as not to damage the cast part 60 during the removal of the plate 36 from the lower mold section 12. Following this, the fastener 42 is completely removed from the plate 36, screwed into the threaded opening 50 of the lock 34, and used to remove the lock 34 from the lower mold section 12 as shown in FIG. 4.

Figure 5:
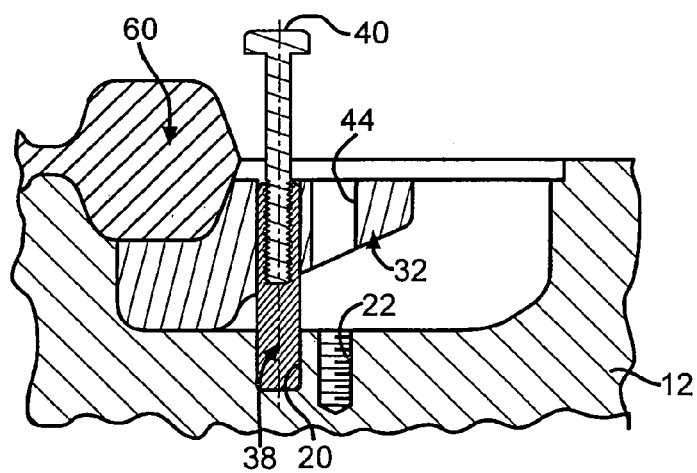
FIG. 5 is a sectional view showing the fourth step of the use of the extraction device to extract a stuck cast part from the lower mold of the casting apparatus in accordance with the present invention.
Figure 6:
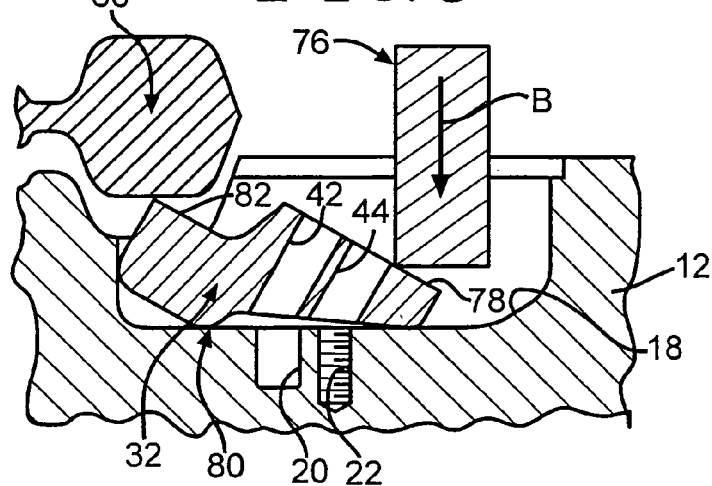
FIG. 6 is a sectional view showing the final step of the use of the extraction device to extract a stuck cast part from the lower mold of the casting apparatus in accordance with the present invention.

The fastener 40 is then installed into a threaded opening 74 provided in the pin 38 as shown in FIG. 5 and used to remove the pin 38 from the lever 32 and the lower mold section 12. Following this, a suitable tool member 76 is used to apply a force in the direction of arrow B against an upper right hand end portion 78 of the lever 32 in FIG. 6 to move the portion 78 downwardly into the cavity until it contacts the associated cavity wall. Such movement causes the lever 32 to pivot about a point 80 causing a left hand end portion 82 of the lever 32 to pivot or move upwardly to raise and eject the stuck cast part 60 from the mold cavity 16.

Although the illustrated embodiment of the casting apparatus 10 is shown to include a single extraction device 30, it is contemplated that a plurality of extraction devices 30 located at predetermined locations within the casting apparatus 10 may be used to insure the application of a uniform extraction force by the devices 30 to the stuck cast part 60 during the ejection of the part 60 from the lower mold section 12. Some of the many factors that may determine the number of devices 30 that are needed can include the shape of the particular cast part 60 and the configuration of the mold sections 12 and 14. Also, the construction of one or more of the lever 32, the lock 34, the plate 36, the pin 38, and the fasteners 40 and 42 can be other than illustrated if so desired. In addition, while the heads 60 and 70 of the fasteners 40 and 42, respectively, are not shown as being recessed into the plate 36, the heads 60 and 70 could be recessed if so desired. However, to facilitate flash clean up, the heads 60 and 70 are preferably not recessed as shown in the illustrated embodiment. Also, while the plate 36 is preferably disposed on the shoulder 24 of the lower mold section 12 to prevent or reduce flash into the pocket 18, the lower mold section 12 could not be provided with the shoulder 24.

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A casting apparatus comprising:
   a moveable mold section and a stationary mold section, wherein when the moveable mold section is in a closed position and in contact with the stationary mold section a part shape cavity is defined; and
   a manually operated extraction member wholly self-contained within the stationary mold section during the casting of a cast part whereby access to said extraction member is allowed only when the moveable mold section is in an open position and spaced apart from contact with the stationary mold section, said extraction member disposed adjacent the part shape cavity and releasably secured to the stationary mold section so as to be selectively moveable between a first position, wherein said manually operated extraction member cooperates with the mold sections to form a part of the part shape cavity, and a second position, wherein said manually operated extraction member is operative to engage and eject a stuck cast part from the stationary mold section of the part shape cavity.

2. The extraction device according to claim 1 wherein said manually operated extraction member is disposed in a cavity provided in the stationary mold section.

3. The extraction device according to claim 1 wherein said manually operated extraction member includes a shoulder for supporting said manually operated extraction member on a ledge of the stationary mold section to prevent flash into said cavity thereof during a casting process.

4. The extraction device according to claim 1 wherein said manually operated extraction member includes a manually actuated lever and a threaded fastener which is operative to releasably secure said manually actuated lever in the stationary mold.

5. A casting apparatus comprising:
   a moveable mold section and a stationary mold section, wherein when the moveable mold section is in a closed position and in contact with the stationary mold section a part shape cavity is defined; and
   a manually operated extraction member wholly self-contained within a cavity of the stationary mold section during the casting of a cast part whereby access to said extraction member is allowed only when the moveable mold section is in an open position and spaced apart from contact with the stationary mold section, said manually operated extraction member disposed adjacent the part shape cavity and releasably secured to the stationary mold section so as to be selectively moveable between a first position, wherein said manually operated extraction member cooperates with the mold sections to form a part of the part shape cavity, and a second position, wherein said manually operated extraction member is operative to engage and eject a stuck cast part from the stationary mold section of the part shape cavity, said manually operated extraction member includes a manually actuated lever and a threaded fastener which is operative to releasably secure said lever in the cavity of the stationary mold.

6. The extraction device according to claim 5 wherein said manually operated extraction member includes a shoulder for supporting said manually operated extraction member on a ledge of the stationary mold section to prevent flash into said cavity thereof during a casting process.

7. A casting apparatus comprising:
a stationary mold section;
a moveable mold section which is moveable relative to said stationary mold section between an opened position and a closed position, in said closed position said moveable mold section in contact with said stationary mold section to define a part shape cavity; and
a manually operated extraction device for removing a stuck cast part from said stationary mold section, said manually operated extraction member wholly self-contained within disposed in said stationary mold section during the casting of the cast part whereby access to said extraction member is allowed only when the moveable mold section is in an open position and spaced apart from contact with the stationary mold section, said manually operated extraction member disposed adjacent said part shape cavity and releasably secured to the stationary mold section so as to be selectively moveable between a first position, wherein said manually operated extraction member cooperates with the mold sections to form a part of said part shape cavity, and a second position, wherein said manually operated extraction member is operative to engage and eject the stuck cast part from said stationary mold section of said part shape cavity.

8. The casting apparatus according to claim 7 wherein a plurality of said manually operated extraction devices are disposed in said stationary mold section.

9. The casting apparatus according to claim 7 wherein said manually operated extraction member is disposed in a cavity provided in said stationary mold section.

10. The extraction device according to claim 7 wherein said manually operated extraction member includes a shoulder for supporting said manually operated extraction member on a ledge of said stationary mold section to prevent flash into said cavity thereof during a casting process.

11. The extraction device according to claim 7 wherein said manually operated extraction member includes a manually actuated lever and a first threaded fastener which is operative to releasably secure said manually actuated lever in the stationary mold.

12. The casting apparatus according to claim 4 wherein said threaded fastener extends through a non-threaded opening provided in said lever and is threadably received in a threaded opening provided in the stationary mold section to thereby releasably secure said lever to the stationary mold section.

* * * * *

UNITED STATES PATENT AND TRADEMARK OFFICE
CERTIFICATE OF CORRECTION

PATENT NO.    : 6,991,208 B1                                                                   Page 1 of 1
DATED         : January 31, 2004
INVENTOR(S)   : Trent S. Herman It is certified that error appears in the above-identified patent and that said Letters Patent is hereby corrected as shown below:

<u>Column 5,</u>
Line 30, after "within" delete "disposed in".

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,991,208 B1 Page 1 of 1
DATED : January 31, 2006
INVENTOR(S) : Trent S. Herman It is certified that error appears in the above-identified patent and that said Letters Patent is hereby corrected as shown below:

<u>Column 5,</u>
Line 30, after "within" delete "disposed in".

This certificate supersedes Certificate of Correction issued April 4, 2006.

Signed and Sealed this

Twenty-fifth Day of April, 2006

JON W. DUDAS
*Director of the United States Patent and Trademark Office*